United States Patent
Kitaguchi et al.

(10) Patent No.: US 10,906,992 B2
(45) Date of Patent: Feb. 2, 2021

(54) METHOD FOR PRODUCING LOW POLYMERIZATION DEGREE CELLULOSE ETHER

(71) Applicant: Shin-Etsu Chemical Co., Ltd., Tokyo (JP)

(72) Inventors: Taishi Kitaguchi, Joetsu (JP); Akira Kitamura, Joetsu (JP); Shintaro Matsusue, Joetsu (JP); Mitsuhiro Yoshida, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/726,009

(22) Filed: Oct. 5, 2017

(65) Prior Publication Data
US 2018/0100030 A1    Apr. 12, 2018

(30) Foreign Application Priority Data

Oct. 6, 2016  (JP) ................................ 2016-198180

(51) Int. Cl.
  *C08B 11/02* (2006.01)
  *C08B 11/08* (2006.01)
(52) U.S. Cl.
  CPC ............. *C08B 11/08* (2013.01); *C08B 11/02* (2013.01)
(58) Field of Classification Search
  CPC .......... C08B 11/20; C08B 11/12; C08B 11/08
  USPC .................................................... 536/86, 88
  See application file for complete search history.

(56) References Cited

U.S. PATENT DOCUMENTS

| | | |
|---|---|---|
| 4,061,859 A | 12/1977 | Cheng |
| 5,008,113 A | 4/1991 | Kokubo et al. |
| 5,476,668 A * | 12/1995 | Kobayashi ........... A61K 9/2866 424/488 |
| 2010/0063269 A1 * | 3/2010 | Mallon .................. C08B 11/20 536/88 |
| 2015/0291707 A1 * | 10/2015 | Macchi .................. C08B 11/12 536/63 |

FOREIGN PATENT DOCUMENTS

| | | | | |
|---|---|---|---|---|
| DE | 10009642 C1 * | 6/2001 | ............. | C08B 11/20 |
| GB | 1255723 A * | 12/1971 | ............. | C08B 11/00 |
| JP | 63-185932 A | 8/1988 | | |
| JP | 2003-503557 A | 1/2003 | | |
| JP | 2009-540098 A | 11/2009 | | |
| WO | WO 01/00680 A1 | 1/2001 | | |
| WO | WO 2007/145709 A1 | 12/2007 | | |

OTHER PUBLICATIONS

Prajapat et al ("A novel approach for intensification of enzymatic depolymerization of carboxymethyl cellulose using ultrasonic and ultraviolet irradiations", Chemical Engineering Journal 290 (Apr. 15, 2016) 391-399). (Year: 2016).*

* cited by examiner

*Primary Examiner* — Shaojia A Jiang
*Assistant Examiner* — Everett White
(74) *Attorney, Agent, or Firm* — Birch, Stewart, Kolasch & Birch, LLP

(57) ABSTRACT

There is provided a method for producing a low polymerization degree cellulose ether having a less yellowish appearance and having excellent long-term storage stability through depolymerization of a high polymerization degree cellulose ether with an acid and without requiring an additive other than the acid. More specifically, there is provided a method for producing a low polymerization degree cellulose ether, including a step of depolymerizing a high polymerization degree cellulose ether with an acid to obtain a low polymerization degree cellulose ether mixture and a step of neutralizing the acid present in the low polymerization degree cellulose ether mixture, wherein ultraviolet is applied in the step of depolymerizing or between the steps of depolymerizing and neutralizing.

3 Claims, No Drawings

METHOD FOR PRODUCING LOW POLYMERIZATION DEGREE CELLULOSE ETHER

BACKGROUND OF THE INVENTION

1. Field of the Invention

The invention relates to a method for producing a low polymerization degree cellulose ether.

2. Related Art

A low polymerization degree cellulose ether is used for film coating on a solid preparation such as a tablet. Such film coating is applied to mask unpleasant tastes of a pharmaceutical drug, to prevent deterioration of a contained drug, and to control the elution behavior in digestive organs after administration.

The film coating is applied to the outermost surface of a tablet so that the low polymerization degree cellulose ether for the film coating is preferably made pure white in consideration of easy coloration in a preparation process and a visual sense for administration.

The low polymerization degree cellulose ether is produced through depolymerization of a high polymerization degree cellulose ether which has been prepared in a usual manner, wherein the depolymerization is carried out for facilitating coating.

In a widely used method, an acid is used to depolymerize a high polymerization degree cellulose ether into a low polymerization degree cellulose ether. However, the low polymerization degree cellulose ether obtained through the depolymerization in such a method is known to have a yellowish color (change into yellow) as compared with the high polymerization degree cellulose ether before the depolymerization (JP 2003-503557T, which is the Japanese phase publication of WO 01/000680).

Examples of a method for suppressing the yellowing of a low polymerization degree cellulose ether include a method of suppressing yellowing of a depolymerized product by sulfur dioxide gas wherein the depolymerized product is obtained by bringing a high polymerization degree cellulose ether into contact with an acid such as hydrogen chloride gas or the other hydrogen halide gas for depolymerization (JP 52-152985A); a method in which depolymerization is carried out in a diluent such as an alcohol (JP 2009-540098T, which is the Japanese phase publication of WO 2007/145709); and a method of suppressing yellowing of a film-coating preparation containing a film-coating layer by irradiation of ultraviolet on the preparation (JP 63-185932A).

SUMMARY OF THE INVENTION

In the method disclosed in JP 52-152985A, by bringing a depolymerized product into contact with sulfur dioxide, a by-product derived from a sulfur-containing compound is newly generated, and thus the method is unsuitable for pharmaceutical applications.

In the method disclosed in JP 2009-540098T, since the depolymerization is carried out in a diluent such as isopropyl alcohol, the method requires a step of separating the diluent from the low polymerization degree cellulose ether after the depolymerization. Such a step is unfavorable for production efficiency, and the diluent may unfavorably remain.

By the method disclosed in JP 63-185932A, the irradiation of ultraviolet improves the whiteness of the preparation containing a cellulose ether, but the cellulose ether has a problem of poor storage stability since it still turns yellow during long-term storage.

In view of the above circumstances, there is a demand for a method for producing a low polymerization degree cellulose ether having a less yellowish appearance and excellent long-term storage stability, through the depolymerization of a high polymerization degree cellulose ether with an acid and without requiring an additive other than the acid As a result of intensive studies for achieving the object, the inventors have found that a low polymerization degree cellulose ether having less yellowing and having less change in appearance after long-term storage can be produced, and have completed the invention.

According to the invention, there is provided a method for producing a low polymerization degree cellulose ether, comprising the steps of: depolymerizing a high polymerization degree cellulose ether with an acid to obtain a low polymerization degree cellulose ether mixture, and neutralizing the acid present in the low polymerization degree cellulose ether mixture, wherein ultraviolet is applied in the step of depolymerizing or between the steps of depolymerizing and neutralizing. The high polymerization degree cellulose ether means a cellulose ether before depolymerization, while the low polymerization degree cellulose ether means a cellulose ether after depolymerization.

According to the invention, the low polymerization degree cellulose ether having less yellowing and having less change in appearance after long-term storage can be produced even after depolymerization of the high polymerization degree cellulose ether with an acid.

DETAILED DESCRIPTION OF THE PREFERRED EMBODIMENTS

The high polymerization degree cellulose ether is a water-soluble cellulose ether to which substituents are introduced to improve the solubility in water, and is exemplified by nonionic cellulose ethers such as an alkyl cellulose, a hydroxyalkyl cellulose and a hydroxyalkyl alkyl cellulose, and ionic cellulose ethers such as a carboxyalkyl cellulose.

Examples of the alkyl cellulose include methyl cellulose having a DS of methoxy groups of 1.0 to 2.2 and ethyl cellulose having a DS of ethoxy groups of 2.0 to 2.6.

Examples of the hydroxyalkyl cellulose include hydroxyethyl cellulose having an MS of hydroxyethoxy groups of 0.05 to 3.0 and hydroxypropyl cellulose having an MS of hydroxypropoxy groups of 0.05 to 3.3.

Examples of the hydroxyalkyl alkyl cellulose include hydroxyethyl methyl cellulose having a DS of methoxy groups of 1.0 to 2.2 and an MS of hydroxyethoxy groups of 0.1 to 0.6, hydroxypropyl methyl cellulose having a DS of methoxy groups of 1.0 to 2.2 and an MS of hydroxypropoxy groups of 0.1 to 0.6, and hydroxyethyl ethyl cellulose having a DS of ethoxy groups of 1.0 to 2.2 and an MS of hydroxyethoxy groups of 0.1 to 0.6.

Examples of the carboxyalkyl cellulose include carboxymethyl cellulose having a DS of carboxymethoxy groups of 0.2 to 2.2.

The DS means a degree of substitution and is the average number of hydroxy groups substituted by alkoxy groups per glucose ring unit of cellulose. The MS means a molar substitution and is the average mole number of hydroxyalkoxy groups added per glucose ring unit of cellulose.

The method of measuring the average degree of substitution of alkoxy groups or hydroxyalkoxy groups is exemplified by the assay for methyl cellulose in the Japanese Pharmacopoeia Seventeenth Edition.

A 2% by weight aqueous solution of the high polymerization degree cellulose ether has a viscosity at 20° C. of preferably more than 20 mPa·s, more preferably 50 to 3,000 mPa·s, even more preferably 100 to 2,000 mPa·s, particularly preferably 500 to 1,800 mPa·s.

The viscosity at 20° C. of a 2% by weight aqueous solution of the high polymerization degree cellulose ether (before depolymerization) or the low polymerization degree cellulose ether (after depolymerization) can be determined with a Brookfield viscometer in accordance with JIS Z8803 when the viscosity is 600 mPa·s or more, or can be determined with an Ubbelohde-type viscometer in accordance with JIS (Japanese Industrial Standards) K2283-1993 when the viscosity is less than 600 mPa·s.

In a typical method of producing the high polymerization degree cellulose ether, alkali cellulose produced by bringing pulp into contact with an aqueous alkali metal hydroxide solution is first reacted with an etherifying agent. An alkali metal hydroxide and an etherifying agent may be present together so that the produced alkali cellulose may be immediately reacted with the etherifying agent. Alternatively, after the production of alkali cellulose, an etherifying agent may be added and reacted. The alkali metal hydroxide is not particularly limited, and is preferably sodium hydroxide from the standpoint of economy. The etherifying agent useful for the production of the high polymerization degree cellulose ether is not particularly limited. Examples of the etherifying agent include alkyl halides such as methyl chloride; ethylene oxide; and propylene oxide. The etherification product is then subjected to optional purification, optional drying, and optional pulverization to obtain the high polymerization degree cellulose ether.

The purification method and the purification device are not particularly limited. Examples of the purification may include preferably washing with water, more preferably washing with hot water (preferably of 85 to 100° C.) from the standpoint of economy. The cellulose ether to be washed turns into a gel in hot water so that the cellulose ether is insoluble in hot water.

The drying method and the dryer are not particularly limited. The temperature of the high polymerization degree cellulose ether during drying is preferably 40 to 80° C. from the standpoint of obtaining the low polymerization degree cellulose ether having less yellowing.

The pulverization method and the pulverizer are not particularly limited. A pulverization system suitable for pulverization in a short period of time is preferable from the standpoint of obtaining the low polymerization degree cellulose ether having less yellowing. Examples of the pulverizer suitable for pulverization in a short period of time include an impact mill such as Turbo Mill (manufactured by TURBO CORPORATION) and Victory Mill (manufactured by Hosokawa Micron Corporation).

The high polymerization degree cellulose ether after the optional pulverization is depolymerized with an acid to obtain a low polymerization degree cellulose ether mixture. The acid to be used for the depolymerization may be in the state of a gas, liquid, or solution and may be of any type as long as an aqueous solution thereof donates a proton. Typically, hydrogen chloride gas, or an aqueous solution or alcohol solution of hydrogen chloride is preferably used.

The aqueous solution of hydrogen chloride has a concentration of preferably 1 to 45% by weight, more preferably 5 to 40% by weight.

The amount of the acid to be added is preferably 0.1 to 3.0% by weight, more preferably 0.15 to 1.5% by weight relative to the amount of the high polymerization degree cellulose ether from the standpoint of controlling the viscosity of the low polymerization degree cellulose ether.

The inner temperature of the reaction vessel during the depolymerization is preferably 40 to 130° C., more preferably 50 to 110° C., even more preferably 60 to 90° C. from the standpoint of controlling the viscosity of the low polymerization degree cellulose ether.

The depolymerization time is not particularly limited as long as the low polymerization degree cellulose ether after the depolymerization can provide an aqueous solution having an intended viscosity. The depolymerization time is preferably 0.1 to 4 hours.

According to the invention, the low polymerization degree cellulose ether having less yellowing can be produced through the application of ultraviolet during the acid depolymerization or after the completion of the depolymerization. The term "during acid depolymerization" means the time in which the acid depolymerization proceeds, and is preferably during heating after the addition of the acid. The term "after the completion of acid depolymerization" means the time after intended depolymerization is achieved by using the acid, and is preferably after the completion of the heating for the depolymerization.

The wavelength of the ultraviolet to be applied to the cellulose ether is preferably 100 to 400 nm, more preferably 100 to 380 nm from the standpoint of obtaining the low polymerization degree cellulose ether having less yellowing. The light source is not particularly limited, and preferably has a large spectroscopic intensity in an ultraviolet region. Examples of the light source include a low-pressure mercury lamp, a high-pressure mercury lamp, and a xenon lamp.

When ultraviolet is applied to the cellulose ether during the acid depolymerization, a light source is installed, for example, inside or outside a reaction vessel to apply ultraviolet during the depolymerization. When the light source is installed outside a reaction vessel to apply ultraviolet, the reaction vessel preferably comprises a material having high ultraviolet transmittance, such as quartz glass, from the standpoint of obtaining the low polymerization degree cellulose ether having less yellowing. The ultraviolet is irradiated preferably continuously during the depolymerization, and is preferably applied evenly to the cellulose ether from the standpoint of obtaining the low polymerization degree cellulose ether having less yellowing.

When ultraviolet is applied to a low polymerization degree cellulose ether after the completion of the acid depolymerization, the reaction product after the completion of the depolymerization is taken out of the reaction vessel and is irradiated with ultraviolet. The method of applying ultraviolet is not particularly limited as long as the reaction product after the completion of depolymerization can be evenly irradiated with ultraviolet. Examples of the method of applying ultraviolet include a method in which the reaction product after the completion of the depolymerization is placed on a conveyor belt and allowed to pass under the ultraviolet; and a method in which the reaction product after the completion of depolymerization is placed in a container such as a coating pan and is irradiated with the ultraviolet while the container is rotated.

The cumulative dose of ultraviolet is preferably 50 J or more relative to 1 g of a target high polymerization cellulose ether to be depolymerized. When the cumulative dose is less than 50 J, there is a possibility that the low polymerization degree cellulose ether having less yellowing is not produced. The upper limit of the cumulative dose is not particularly limited as long as the low polymerization degree cellulose ether after the ultraviolet irradiation has an intended whiteness, and is preferably 300 J or less relative to 1 g of the cellulose ether. The cumulative dose can be calculated by multiplying an ultraviolet intensity (mW/cm$^2$) by an irradiation area (cm$^2$) and an irradiation time (seconds).

An aqueous solution of the low polymerization degree cellulose ether produced by the acid depolymerization and the ultraviolet irradiation is neutralized with an alkali such as sodium bicarbonate or sodium carbonate. A 2% by weight aqueous solution at 20° C. of the low polymerization degree cellulose ether after the neutralization has a pH value of preferably 6.0 to 8.0, more preferably 6.5 to 7.5. The neutralization after the ultraviolet irradiation results in the production of the low polymerization degree cellulose ether having less yellowing and having less change in appearance after long-term storage.

The viscosity reduction ratio after the depolymerization is not particularly limited, and is preferably 60 to 99.9%, more preferably 80 to 99.9%, even more preferably 95 to 99.9% from the standpoint of obtaining the low polymerization degree cellulose ether having less yellowing. The viscosity reduction ratio after the depolymerization is defined as the ratio of the difference between the viscosity at 20° C. of 2% by weight aqueous solution of a high polymerization degree cellulose ether (before depolymerization) and the viscosity at 20° C. of 2% by weight aqueous solution of a low polymerization degree cellulose ether (after depolymerization) to the viscosity at 20° C. of the 2% by weight aqueous solution of the high polymerization degree cellulose ether (before depolymerization). In other words, the visocosity reduction ratio is expressed as {(viscosity before depolymerization)−(viscosity after depolymerization)}/(viscosity before depolymerization) in terms of the viscosity at 20° C. of 2% by weight aqueous solution.

EXAMPLES

The invention will next be described in detail with reference to Examples and Comparative Examples. It should not be construed that the invention is limited to or by Examples.

Example 1

A high polymerization degree hydroxypropyl methyl cellulose having a DS of methoxy groups of 1.89 and an MS of hydroxypropyl groups of 0.24 and having such viscosity as to allow the viscosity at 20° C. of a 2% by weight aqueous solution of the high polymerization degree hydroxypropyl methyl cellulose to be 1,240 mPa·s, was produced in a usual manner. A 14% by weight hydrochloric acid was added to the high polymerization degree hydroxypropyl methyl cellulose in such an amount that the hydrogen chloride component became 0.4% by weight relative to the amount of hydroxypropyl methyl cellulose. The resulting mixture was placed in a quartz glass reaction vessel, and the inner temperature of the vessel was adjusted at 80° C. to start the depolymerization reaction. Concurrently with the start of the reaction, ultraviolet was applied by using a high-pressure mercury lamp (type HL100G manufactured by Sen Lights Corporation, an ultraviolet intensity of 150 mW/cm$^2$ at a distance of 20 cm from the lamp end, and an irradiation area of 28 cm$^2$) installed at a distance of 20 cm from the top of the reaction vessel. The depolymerization reaction was carried out for 90 minutes, while the ultraviolet was continuously irradiated during the depolymerization reaction. The cumulative dose of the ultraviolet was 22,680 J, and the dose of the ultraviolet relative to 1 g of the cellulose ether was 94.5 J. After the completion of the depolymerization reaction, sodium bicarbonate was added to neutralize the product mixture to obtain a low polymerization degree hydroxypropyl methyl cellulose. A 2% by weight aqueous solution of the obtained low polymerization degree hydroxypropyl methyl cellulose had viscosity at 20° C. of 3.0 mPa·s and a pH value of 6.7, as determined by the measurement method in the Japanese Pharmacopoeia Seventeenth Edition. The viscosity reduction ratio by the acid depolymerization was {1−(3.0/1240)}×100=99.8%.

The powder yellowness of the low polymerization degree hydroxypropyl methyl cellulose after the depolymerization was determined to be 7.4 with an SM Color Computer SM-4 (manufactured by Suga Test Instruments Co., Ltd.).

The low polymerization degree hydroxypropyl methyl cellulose after the depolymerization was allowed to stand in a constant low temperature and constant humidity chamber (type TPAV120-20 manufactured by Isuzu Seisakusho) of 40° C. and 75% RH (relative humidity) for one month, while the powder yellowness was measured every week. The results are shown in Table 1.

Example 2

A 14% by weight hydrochloric acid was added to the same high polymerization degree hydroxypropyl methyl cellulose as in Example 1 in such an amount that the hydrogen chloride component became 0.4% by weight relative to the amount of the hydroxypropyl methyl cellulose. The resulting mixture was placed in a quartz glass reaction vessel, the inner temperature of the vessel was adjusted at 80° C., and the depolymerization reaction was carried out for 90 minutes. After the completion of the depolymerization reaction, the reaction product was spread on a petri dish and irradiated with ultraviolet for 90 minutes by using the same device as in Example 1 installed at a distance of 20 cm from the top of the petri dish. During the irradiation, the reaction product was stirred every 30 minutes for the top-to-bottom reversal. The cumulative dose of the ultraviolet was 22,680 J, and the dose of the ultraviolet relative to 1 g of the cellulose ether was 94.5 J. After 90 minutes of the ultraviolet irradiation, sodium bicarbonate was added to neutralize the product mixture to obtain a low polymerization degree hydroxypropyl methyl cellulose. A 2% by weight aqueous solution of the obtained low polymerization degree hydroxypropyl methyl cellulose had viscosity at 20° C. of 3.0 mPa·s and a pH value of 6.6, as determined by the measurement method in the Japanese Pharmacopoeia Seventeenth Edition. The viscosity reduction ratio by the acid depolymerization was {1−(3.0/1240)}×100=99.8%.

The powder yellowness was determined to be 7.0 in the same manner as in Example 1.

The low polymerization degree hydroxypropyl methyl cellulose after the depolymerization was allowed to stand in the same chamber as in Example 1 of 40° C. and 75% RH for one month, while the powder yellowness was measured every week. The results are shown in Table 1.

Comparative Example 1

The depolymerization reaction was carried out by using the same high polymerization degree hydroxypropyl methyl cellulose as in Example 1 as the starting material in the same manner as in Example 1 except that the ultraviolet irradiation by a high-pressure mercury lamp was not carried out. A 2% by weight aqueous solution of the obtained low polymerization degree hydroxypropyl methyl cellulose had viscosity at 20° C. of 3.1 mPa·s and a pH value of 6.8, as determined by the measurement method in the Japanese Pharmacopoeia Seventeenth Edition. The viscosity reduction ratio by the acid depolymerization was {1−(3.1/1240)}×100 =99.8%. The powder yellowness of the obtained low polymerization degree hydroxypropyl methyl cellulose was determined to be 9.6 in the same manner as in Example 1.

The low polymerization degree hydroxypropyl methyl cellulose after the depolymerization was allowed to stand in the same chamber as in Example 1 of 40° C. and 75% RH for one month, while the powder yellowness was measured every week. The results are shown in Table 1.

Reference Example 1

A 14% by weight hydrochloric acid was added to the same high polymerization degree hydroxypropyl methyl cellulose as in Example 1 in such an amount that the hydrogen chloride component became 0.4% by weight relative to the amount of hydroxypropyl methyl cellulose. The resulting mixture was placed in a quartz glass reaction vessel, the inner temperature of the vessel was adjusted at 80° C., and the depolymerization reaction was carried out for 90 minutes. After the completion of the depolymerization reaction, sodium bicarbonate was added to neutralize the product mixture to obtain the low polymerization degree hydroxypropyl methyl cellulose. A 2% by weight aqueous solution of the low polymerization degree hydroxypropyl methyl cellulose had a pH value of 7.0 at 20° C. After the neutralization, the reaction product was spread on a petri dish, and irradiated with ultraviolet for 90 minutes by using the same device as in Example 1 installed at a distance of 20 cm from the top of the petri dish. The cumulative dose of ultraviolet was 22,680 J, and the dose of ultraviolet relative to 1 g of the cellulose ether was 94.5 J. During the irradiation, the reaction product was stirred every 30 minutes for the top-to-bottom reversal.

A 2% by weight aqueous solution of the obtained low polymerization degree hydroxypropyl methyl cellulose had viscosity at 20° C. of 3.0 mPa·s, as determined by the measurement method in the Japanese Pharmacopoeia Seventeenth Edition. The viscosity reduction ratio by the acid depolymerization was {1−(3.0/1240)}×100=99.8%.

The powder yellowness of the obtained low polymerization degree hydroxypropyl methyl cellulose was determined to be 6.8 in the same manner as in Example 1.

The low polymerization degree hydroxypropyl methyl cellulose after the depolymerization was allowed to stand in the same chamber as in Example 1 of 40° C. and 75% RH for one month, while the powder yellowness was measured every week. The results are shown in Table 1.

TABLE 1

| | powder yellowness | | | | |
|---|---|---|---|---|---|
| | after 0 day | after 7 days | after 14 days | after 21 days | after 28 days |
| Example 1 | 7.4 | 7.6 | 7.7 | 8.3 | 8.5 |
| Example 2 | 7.0 | 7.3 | 7.9 | 8.0 | 8.2 |
| Comp. Ex. 1 | 9.6 | 10.0 | 10.2 | 10.5 | 10.9 |
| Ref. Ex. 1 | 6.8 | 8.9 | 13.5 | 16.2 | 16.8 |

The invention claimed is:

1. A method for producing a low polymerization degree cellulose ether, comprising the steps of:

depolymerizing a high polymerization degree cellulose ether with an acid to obtain a low polymerization degree cellulose ether mixture, and neutralizing the acid present in the low polymerization degree cellulose ether mixture, wherein ultraviolet is applied in the step of depolymerizing or between the steps of depolymerizing and neutralizing, and a cumulative dose of the ultraviolet is from 50 J to 300 J relative to 1 g of the high polymerization degree cellulose ether.

2. The method for producing a low polymerization degree cellulose ether according to claim 1, wherein a viscosity reduction ratio by the depolymerizing is 60 to 99.9%, where the viscosity reduction ratio is a ratio of a difference between viscosities at 20° C. of 2% by weight aqueous solutions of the high polymerization degree cellulose ether and the low polymerization degree cellulose ether to a viscosity at 20° C. of the 2% by weight aqueous solution of the high polymerization degree cellulose ether.

3. The method for producing a low polymerization degree cellulose ether according to claim 1, wherein the high polymerization degree cellulose ether is an alkyl cellulose, a hydroxyalkyl cellulose, or a hydroxyalkyl alkyl cellulose.

* * * * *